US012196581B2

(12) United States Patent
Bertin

(10) Patent No.: US 12,196,581 B2
(45) Date of Patent: Jan. 14, 2025

(54) HARMONIC DISTORTION REDUCTION IN INDUCTIVE POSITION SENSORS

(71) Applicant: SEMICONDUCTOR COMPONENTS INDUSTRIES, LLC, Phoenix, AZ (US)

(72) Inventor: Jacques Jean Bertin, Pocatello, ID (US)

(73) Assignee: SEMICONDUCTOR COMPONENTS INDUSTRIES, LLC, Scottsdale, AZ (US)

(*) Notice: Subject to any disclaimer, the term of this patent is extended or adjusted under 35 U.S.C. 154(b) by 2 days.

(21) Appl. No.: 17/657,783

(22) Filed: Apr. 4, 2022

(65) Prior Publication Data

US 2022/0341758 A1 Oct. 27, 2022

Related U.S. Application Data

(60) Provisional application No. 63/201,039, filed on Apr. 9, 2021.

(51) Int. Cl.
G01D 5/20 (2006.01)
(52) U.S. Cl.
CPC ................. G01D 5/2073 (2013.01)
(58) Field of Classification Search
CPC .................................................. G01D 5/2073
See application file for complete search history.

(56) References Cited

U.S. PATENT DOCUMENTS

| 6,236,199 | B1 | 5/2001 | Irle et al. |
| 6,534,970 | B1* | 3/2003 | Ely ..................... G01D 5/2086 |
| | | | 324/207.17 |
| 6,788,221 | B1* | 9/2004 | Ely ......................... H02P 6/16 |
| | | | 341/20 |

(Continued)

FOREIGN PATENT DOCUMENTS

EP          0 909 955 A2       4/1999

OTHER PUBLICATIONS

B. Aschenbrenner and B. G. Zagar "Analysis and Validation of a Planar High-Frequency Contactless Absolute Inductive Position Sensor" in IEEE Trans. ON Instrum. and Meas., Mar. 2015, pp. 768-775.

(Continued)

*Primary Examiner* — Walter L Lindsay, Jr.
*Assistant Examiner* — Milton Gonzalez
(74) *Attorney, Agent, or Firm* — Brake Hughes Bellermann LLP

(57) ABSTRACT

In at least one aspect, an inductive position sensor comprising a target. The inductive position sensor can include a stator including an excitation coil being inductively coupled to the target, and a receiver coil including a first loop connected in series with a second loop, and inductively coupled with the target such that a receiver coil voltage is generated at the receiver coil. The second loop can be offset, on the stator and relative to the first loop, by a portion of a harmonic period corresponding with a harmonic for nullification in the receiver coil voltage. The inductive position sensor can include a control unit configured to receive a plurality of receiver coil voltages including the receiver coil voltage, the control unit configured to generate an angular position signal based on the plurality of receiver coil voltages.

20 Claims, 8 Drawing Sheets

(56) References Cited

U.S. PATENT DOCUMENTS

| | | |
|---|---|---|
| 7,221,154 B2 | 5/2007 | Lee |
| 7,345,473 B2 | 3/2008 | Lee |
| 8,453,518 B2 | 6/2013 | Diekmann et al. |
| 9,528,858 B2 | 12/2016 | Bertin |
| 10,444,037 B2 | 10/2019 | Bertin |
| 11,079,291 B2 | 8/2021 | Bertin |
| 2004/0041572 A1 | 3/2004 | Lin et al. |
| 2006/0066167 A1 | 3/2006 | Saito et al. |
| 2006/0233123 A1 | 10/2006 | Lee |
| 2007/0194782 A1 | 8/2007 | Lee |
| 2009/0133867 A1 | 5/2009 | Kuckes |
| 2010/0319467 A1 | 12/2010 | Diekmann et al. |
| 2012/0175198 A1 | 7/2012 | Thibault et al. |
| 2013/0003820 A1 | 1/2013 | Malhan et al. |
| 2014/0055000 A1 | 2/2014 | Adra |
| 2014/0132253 A1 | 5/2014 | Bertin |
| 2014/0167788 A1 | 6/2014 | Fontanet |
| 2016/0079839 A1 | 3/2016 | Shim et al. |
| 2016/0273945 A1 | 9/2016 | Olsak et al. |
| 2017/0166251 A1 | 6/2017 | Shao et al. |
| 2018/0029223 A1 | 2/2018 | Kitamura et al. |
| 2019/0072414 A1 | 3/2019 | Ultermoehlen et al. |
| 2019/0097501 A1 | 3/2019 | Lin et al. |
| 2020/0088549 A1 | 3/2020 | Shao |
| 2020/0278190 A1 | 9/2020 | Bertini et al. |

OTHER PUBLICATIONS

PEEC-Based Numerical Optimization of Compact Radial Position Sensors for Active Magnetic Bearings; Andreas Müsing, Claudius Zingerli, Philipp Imoberdorf, Johann W. Kolar, Power Electronic Systems Laboratory, ETH Zürich, Switzerland, published in 5th International Conference on Integrated Power Electronics Systems, Mar. 11-13, 2008.

Shao, Lingmin, "Automotive Inductive Position Sensor" (2017). Electronic Thesis and Dissertation Repository. 4569. https://ir.lib.uwo.ca/etd/4569, retrieved on May 5, 2017, 12:00 AM.

* cited by examiner

HARMONIC DISTORTION REDUCTION IN INDUCTIVE POSITION SENSORS

CROSS-REFERENCE TO RELATED APPLICATION

The present application claims priority to U.S. Provisional Application Ser. No. 63/201,039, filed on 9 Apr. 2021, entitled "Harmonic Distortion Reduction in Inductive Position Sensors," which is incorporated herein by reference in its entirety.

TECHNICAL FIELD

The technology described herein generally relates to devices, systems, and methods for determining an angular position of an object using an inductive position sensor.

BACKGROUND

Position sensing devices, including inductive position sensors, are widely used today. Various uses include, but are not limited to, factory settings, industrial robots, and otherwise. Inductive position sensors are often used to determine an angular position of an object.

SUMMARY

The various implementations of the present disclosure relate in general to inductive position sensors and systems and methods for manufacturing and use thereof. The various implementations also relate in general to inductive position sensors in which harmonic and other distortions are nullified.

In at least one aspect, an inductive position sensor comprising a target. The inductive position sensor can include a stator including an excitation coil being inductively coupled to the target, and a receiver coil including a first loop connected in series with a second loop, and inductively coupled with the target such that a receiver coil voltage is generated at the receiver coil. The second loop can be offset, on the stator and relative to the first loop, by a portion of a harmonic period corresponding with a harmonic for nullification in the receiver coil voltage. The inductive position sensor can include a control unit configured to receive a plurality of receiver coil voltages including the receiver coil voltage, the control unit configured to generate an angular position signal based on the plurality of receiver coil voltages.

BRIEF DESCRIPTION OF THE DRAWINGS

The features, aspects, advantages, functions, modules, and components of the devices, systems and methods provided by the various implementations of the present disclosure are further disclosed herein regarding at least one of the following descriptions and accompanying drawing figures. In the appended figures, similar components or elements of the same type may have the same reference number, such as 108, with an additional alphabetic designator, such as 108a, 108n, or the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

Figure 1A:
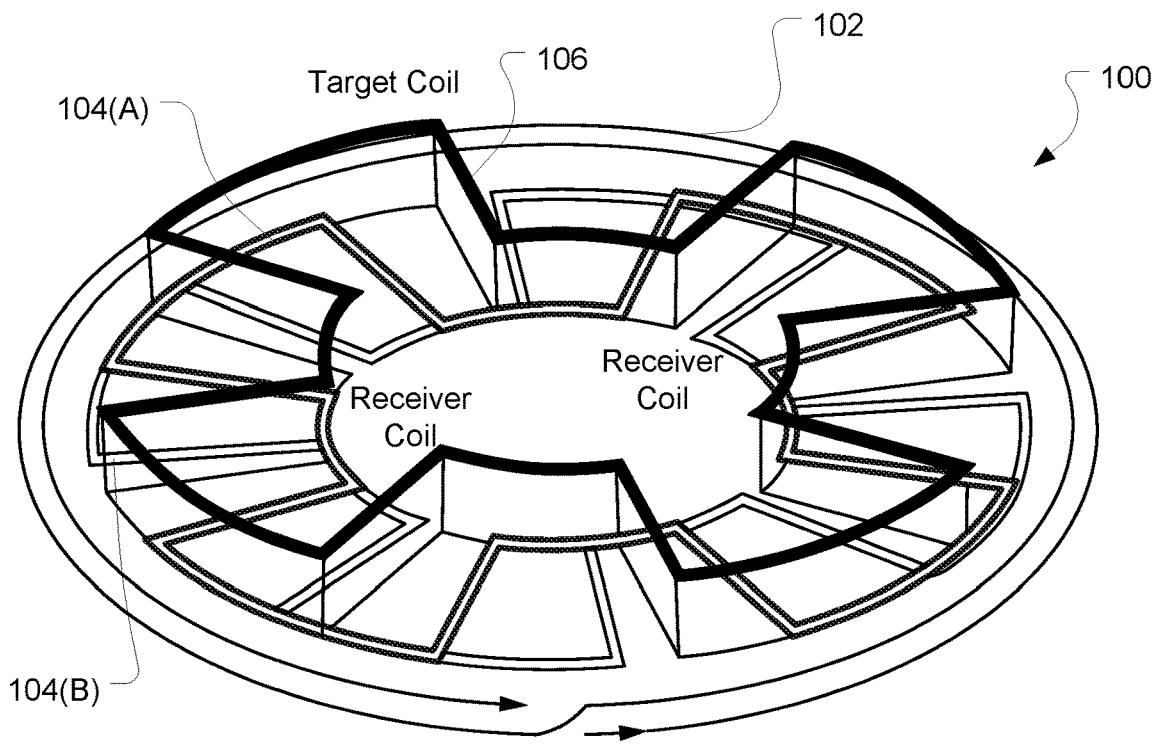
FIG. 1A is a schematic representation of an inductive position sensor.

The various implementations described herein are directed to devices, systems, and methods for inductively determining an angular position of an object using an inductive position sensor wherein one or more harmonics and other distortions in a received signal are nullified.

For at least one implementation of the present disclosure, an inductive position sensor includes an excitation coil, one or more receiver coils, and a target. The inductive position sensor is configured to nullify one or more harmonics otherwise present in a received signal generated by the one or more receiver coils. An excitation coil may include a multi-loop design and any number of loops may be used. The respective ends of the excitation coil may be coupled to a control circuit which controls the providing of electrical currents to the excitation coil from a power source. The control circuit may be coupled to and control one or more switches which selectively couple the excitation coil with a power source. The power source provides an AC signal, which results in the excitation coil generating a first electromagnetic field. Control circuits, switches, and AC sources used with inductive position sensors are well known in the art and any such known or later arising components may be configured for use in an implementation of the present disclosure.

In some implementations, the inductive sensors can include a circular excitation coil configured to generate an electromagnetic field when an electrical alternating current (AC) flows through the coil; a receiving coil, positioned within the excitation coil and configured to detect an electrical potential, a voltage, induced in the receiving coil by the currents flowing through the excitation coil; and a coupling element or rotor, herein a target. The target can be coupled to the object whereby the rotation of the object results in a rotation of the target about a center axis of the excitation coil, with rotation of the object as represented by a rotation of the target being detectable and determinable by the inductive position sensor.

The excitation coil and receive coil(s) can be included in a stator. The target can be separated from a top surface of the stator by an air gap. The target may be configured as a coil, a geometric shape, or otherwise. The target can be configured to disturb the amount of electrical potential induced in the receiving coil based on the target's then occurring angular rotation about the center axis.

Inductive position sensors, however, can be subject to harmonic and other distortions arising due to the magnetic coupling of the target with each of the excitation coil and one or more receiver coils. Such harmonic and other distortions decrease the accuracy of the inductive position sensor. Accordingly, the inductive position sensors described herein cancel, nullify, mitigate and/or otherwise reduce (herein, nullify) influences of harmonic and other distortions in inductive position sensors. Such needs, and other needs, are addressed by one or more of the implementations of the present disclosure.

Figure 1B:
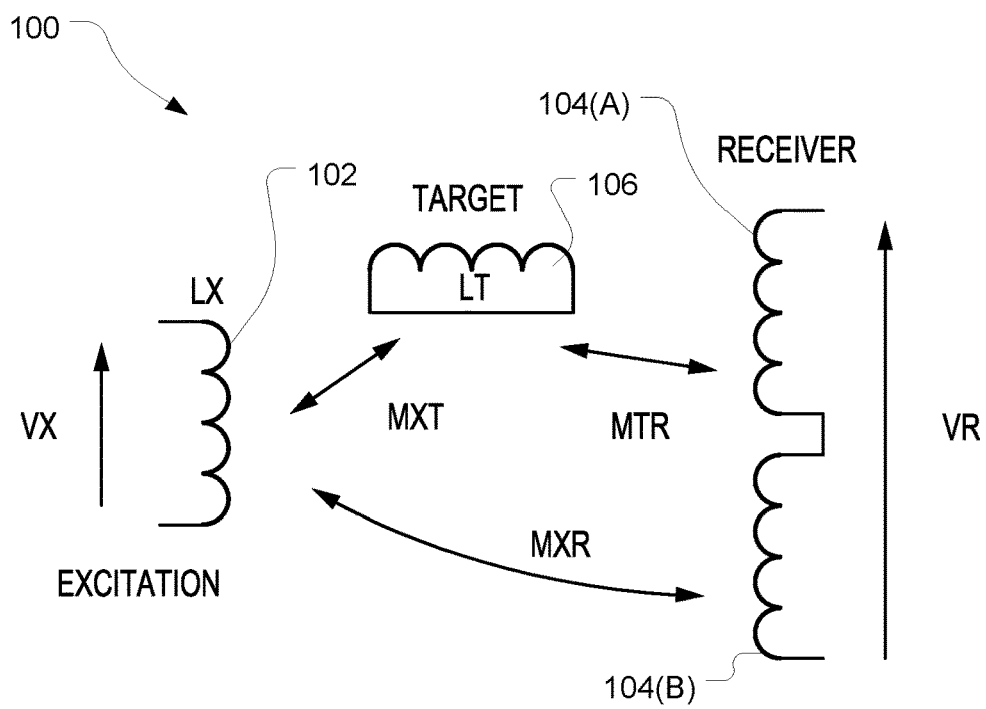
FIG. 1B is an electrical schematic representation of an inductive position sensor of FIG. 1A.

As shown for example in FIGS. 1A and 1B, in general, an inductive position sensor 100 may include a stator having an excitation coil 102, one or more receiver coils 104 (such as a first receiver coil 104(A) and a second receiver coil 104(B), and a rotor/target 106. The excitation coil 102 and the receiver coil(s) 104 are often formed on a single or multiple layer printed-circuit-board (PCB) which is often referred to as a "stator." (not shown). A top surface of the stator may be defined with respect to an X-Y plane in an X-Y-Z coordinate space, the top surface of the stator is separated from the target, by an air gap "Z" as can be determined in view of the X-Y-Z coordinate space. For at least one implementation, the Z axis extends through the center of the stator.

The target 106 may be configured as a coil, as a geometric shape or other configuration that facilitates detectable changes in an angular position of the target 106 through use of inductive coupling of the target 106 with the excitation coil 102 and receiver coil(s) 104. When in a geometric shape, inductive coupling may occur based upon the target 106 having one or more poles, such as a one-pole, two-pole, or other configuration. When configured as a coil, inductive coupling may occur between the target 106 and the excitation coil 102 and receiver coil(s) based upon a receiver coil voltage Vr being induced in a coil forming the receiver 104. The one or more receiver coil voltages Vr are used by a control unit to generate an angular position signal P.

During use, the target may change angular positions by rotating about the Z axis, where the top surface of the stator remains fixed relative to an X-Y plane formed in the coordinate space. The stator can have depth, as determinable in a negative Z (−Z) direction. During use, the air gap distance Z may vary as a tilting of the target 106 occurs relative to the top surface of the stator. Such tilting may occur as one or more of a pitch, a roll, or a combination thereof. The air gap may also vary as a vertical move of the target along the Z axis. The change of angular position may occur as a change in yaw. Such changes in the angular position of the target 106 relative to the top surface of the stator uniquely disturb the voltages induced in the receiving coil(s) 104 such that the angular position of the target 106 can be determined based on the changes in the electrical potential, of the receiver coil voltage(s) Vr. The inductive coupling between the excitation coil 102, target 106, and the receiving coil(s) 104 may be expressed by a series of mathematical functions (each a "transfer function"). Circuitry is connected to the receiving coil(s) 104 detect and determine a target's angular position based on the relative receiver coil voltage(s) Vr present in the receiving coil(s) 104 at a time.

The target 106 may be configured to rotate about a center axis, such as a Z-axis, and above a top surface of the stator (not shown). When an AC current having an excitation voltage Vx is provided in the excitation coil 102, an excitation magnetic field is generated by a first inductance Lx in the vicinity of the excitation coil 102. The excitation magnetic field is coupled to the target 106. An alternating current is induced in the second inductance Lt in the target 106 based upon a mutual inductive coupling of the excitation coil 102 with the target 106. This mutual inductive coupling may be expressed by an excitation-to-target transfer function (Mxt), where Mxt is a function of the target to stator air gap Z. The receiver coil voltage Vr is also formed in each receiver coil 104 based upon mutual inductances formed by a direct inductive couplings of a receiver coil 104 with the excitation coil 102 and by an inductive couplings of the receiver coil 104 with the target 106. These mutual inductances can be respectively expressed by an excitation-to-receiver transfer function (Mxr) and a target-to-receiver transfer function (Mtr), where Mtr is a function of both the air gap Z and the target angle Θ—the then arising angular position of the target 106. In a first approximation, Mtr can be modeled as a product of two functions: Mtr=F(Z) M(Θ), where M(Θ) is a pure sine or cosine.

The mutual inductances Mxr and Mtr result in a receiver coil voltage Vr being generated in the receiver coil 104, where Vr< >0 (zero). Accordingly, Vr can be expressed mathematically as per Equation 1.

$$V_r = \left( \frac{M_{xr}}{L_x} - \frac{M_{xt}(Z)M_{tr}(Z,\Theta)}{L_t L_x} \right) V_x \qquad \text{Equation 1}$$

Further, the inductances Lt and Lx are the mutual inductance Mxr are typically constant. When Mxr is negligible or otherwise compensated, the target angle Θ can be calculated using an arctangent of a ratio of the received signals (from multiple receiver coils 104) offset (e.g., shifted, shifted angularly) by predetermined values (e.g., a specified angular shift), for example, by two receiver coils offset by ninety degrees (90°). When the receiver coil voltage Vr for each of the receiving coils 104 is sensed by a control circuit, the angular position signal P is generated and indicates the angular position of the target coil 106. The receiver coil voltage Vr, for the receiver coil 104, is a function of the relative angular position of the target 106, in a defined coordinate space, relative to the receiver coil 104 and any offset angles used by the two or more receiver coils 104 when utilized in an implementation of the present disclosure.

The transfer functions Mxt and Mtr depend upon the air gap Z formed, for an angular position of the target 106. The amount of the air gap Z influences the signal strength of primary and harmonic distortion formed by the inductive couplings and generated in the receiver coil 104. As the air gap Z narrows, the harmonic distortion influence on the transfer functions increases and the angular positional accuracy determinations of a position sensor decreases. As the air gap Z widens, the strength of the primary signal generated in the receiver coil 104 decreases. Accordingly, trade-offs are often made for conventional angular position sensors between decreasing effects from harmonics without significantly decreasing the primary signal strength. Various implementations of the present disclosure eliminate one or more of such harmonic distortions for a multiple receiver coil inductive position sensor by replacing known configurations for a target 106 with a new target configured in accordance with an implementation of the present disclosure, as described below with reference to FIGS. 5A-5C.

Figure 2B:
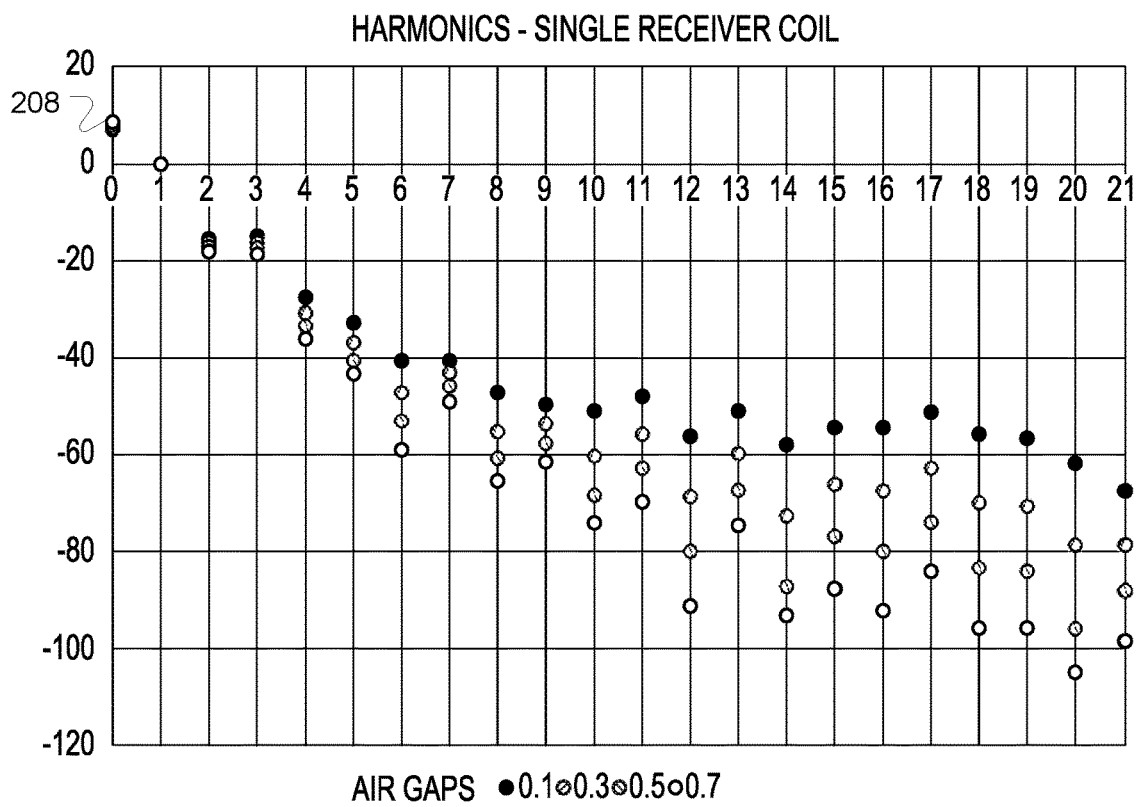
FIG. 2B is a chart illustrating fundamental amplitudes and harmonics generated as a function of an air gap depth by the components shown in FIG. 2A.
Figure 2A:
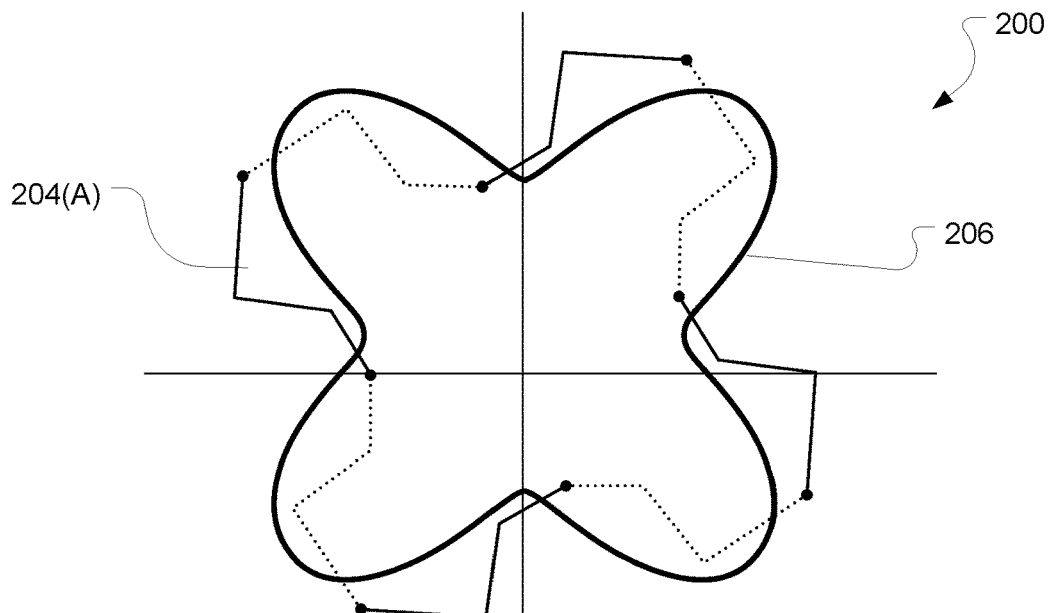
FIG. 2A is a schematic representation of components of an inductive position sensor, specifically a single receiver coil and a target configured as a geometric shape.

As shown in FIG. 2A, a known inductive position sensor 200 having an exemplary receiver coil 204(A) is shown (the excitation coil, which surrounds the receiver coil 204(A), and a second receiver coil (for a two-phase system) or a third receiver coil (for a three phase system) are not shown). The target 206 may be configured as a geometric shape. As shown, the target 206 may have a rotational, mechanical symmetry of ninety degrees (90°), which results in an electrical symmetry of three hundred and sixty degrees (360°). Such an inductive position sensor 200 may generate various harmonics in the receiver coil voltages, as shown in FIG. 2B by various simulated Discrete Fourier Transforms (DFTs). The harmonics may vary based on the air gap Z occurring, at a time. A direct coupling (DC) 208, independent of the rotational position, is also shown. The DC coupling and harmonics are functions of the air gap Z. For the known inductive position sensor 200, harmonics and other distortions are not nullified, as shown by simulated values in FIG. 2B. An example of results obtained, based on simulation, for an inductive position sensor where one or more harmonics and/or other distortions are "nullified" is shown in FIG. 7, which is further described herein below. Various implementations of the present disclosure eliminate one or more of the harmonic distortions generated in the receiver coil voltages for an inductive position sensor by replacing known configurations for a target 106 with a new target configured in accordance with an implementation of the present disclosure, as described below with reference to FIGS. 5A-5C.

Figure 3B:
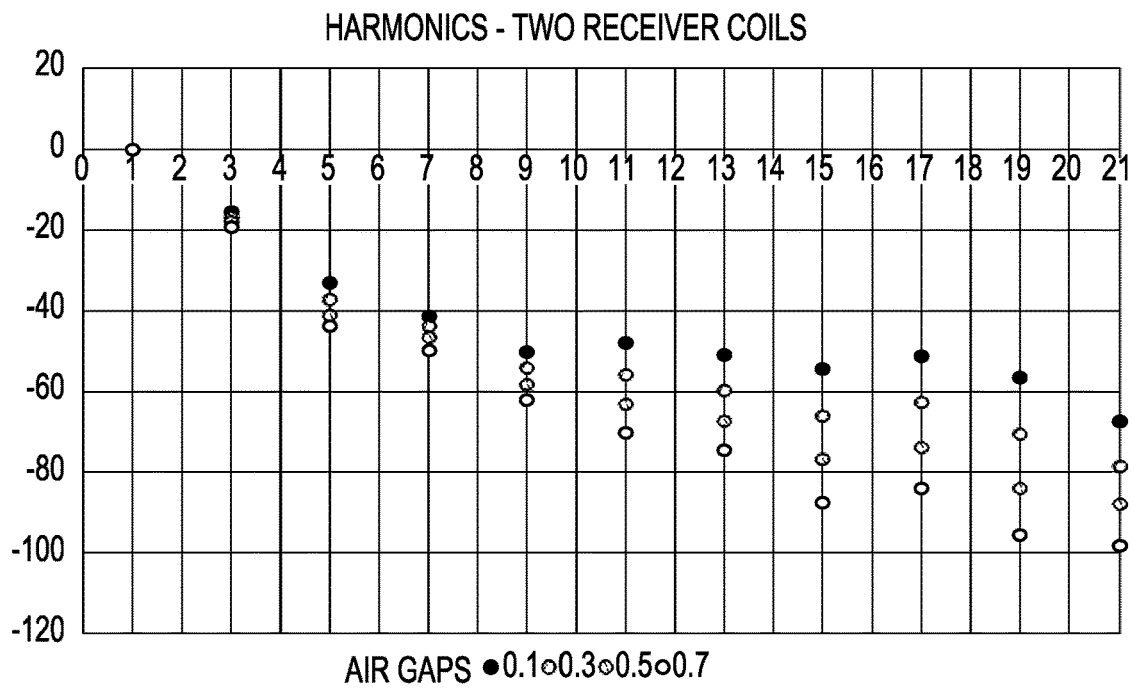
FIG. 3B is a chart illustrating fundamental amplitudes and harmonics generated as a function of an air gap depth by components shown in FIG. 3A.
Figure 3A:
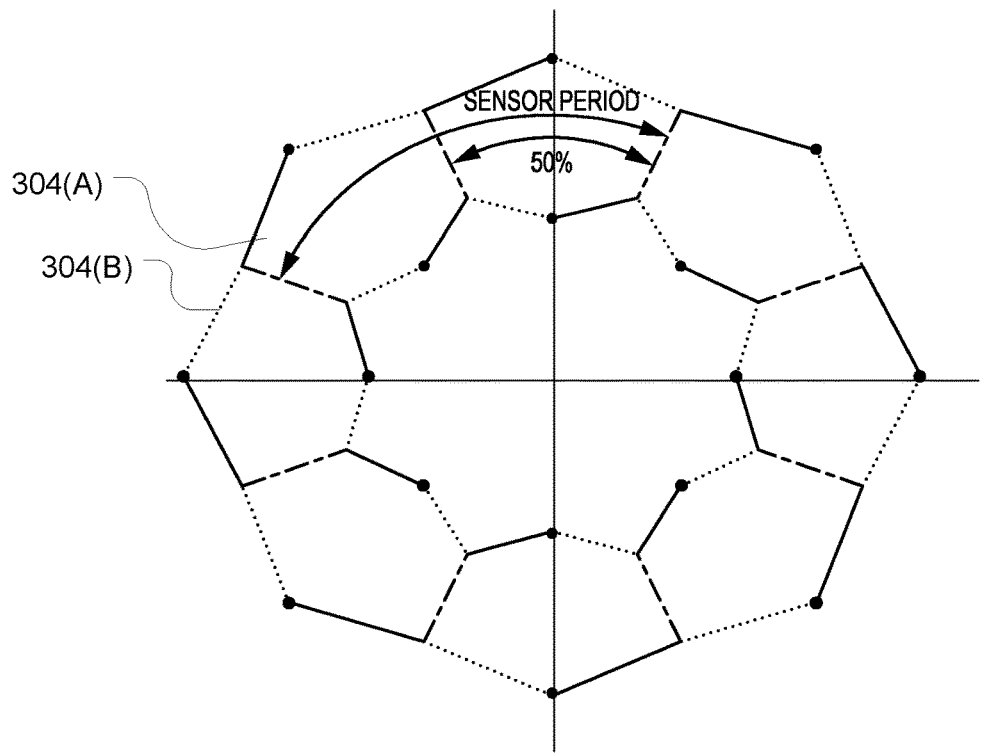
FIG. 3A is a schematic representation of components of an inductive position sensor, specifically two loops of a single receiver coil configured as a geometric shape.

As shown in FIGS. 3A and 3B for a two-phase system and three-phase, the DC component, even harmonics and multiples of the even harmonic (e.g., the $4^{th}$, $6^{th}$, $8^{th}$, $10^{th}$ and $12^{th}$) in a receive coil voltage may be nullified by use of a known stator having a first receiver coil, having a first loop 304(A) and a second loop 304(B), and, a second receiver coil (not shown). The first and second receiver coils may have identical configurations. In this implementation, the receiver coil loops may be offset by one-half (½) a period and connected in an anti-series such that Mtr=F(Z) (M(Θ)−M(Θ+π). The receiver coils generate, respectively, a first receiver coil voltage Vr1, and a second receiver coil voltage Vr2. The receiver coil voltages Vr1/Vr2, are provided to a control unit which generates the angular position signal P. However, when the target 206 (not shown in FIG. 3A) is used, undesired harmonics are still present and distortion may occur in the known inductive position sensor of FIGS. 3A and 3B. Various implementations of the present disclosure eliminate one or more of the harmonic distortions generated in an inductive position sensor by replacing known configurations for a target 106 with a new target configured in accordance with an implementation of the present disclosure, as described below with reference to FIGS. 5A-5C and/or by modifying the receiver coils 304, as described below with reference to FIGS. 6A and 6B.

Figure 4B:
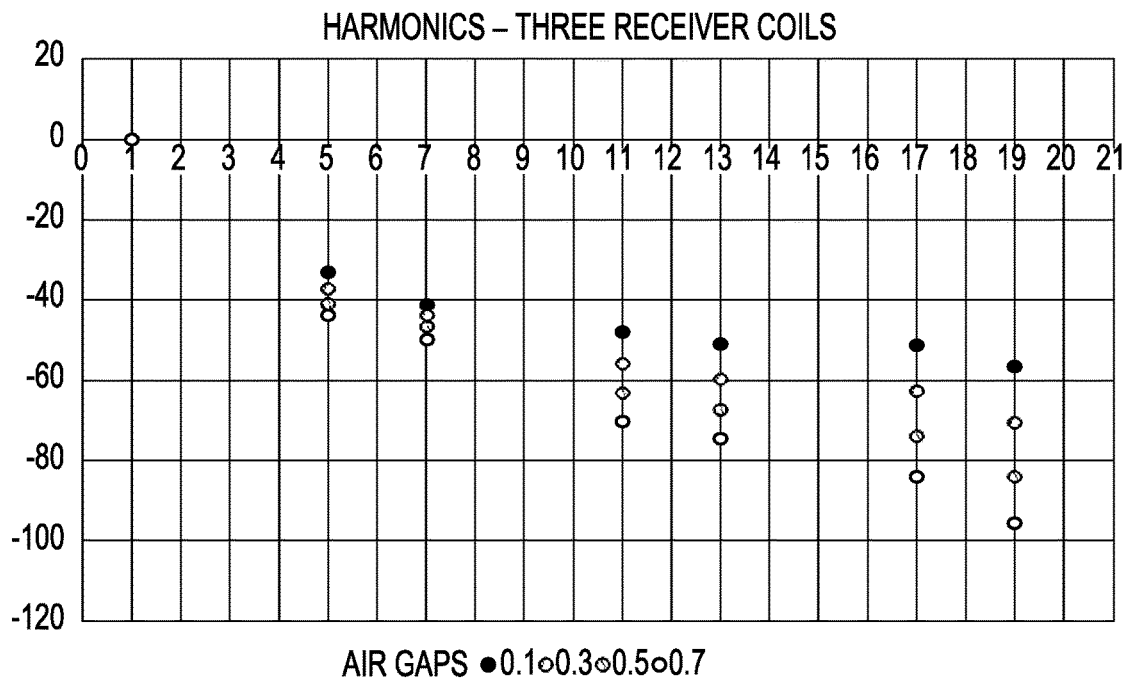
FIG. 4B is a chart illustrating fundamental amplitudes and harmonics generated as a function of an air gap depth by the components shown in FIG. 4A.
Figure 4A:
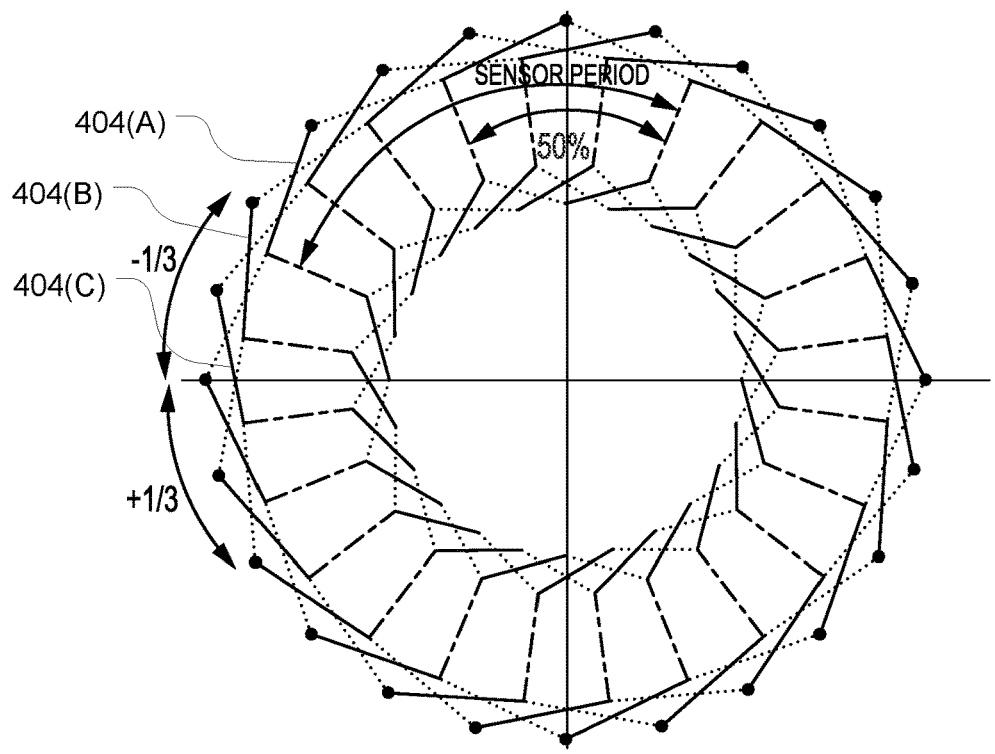
FIG. 4A is a schematic representation of components of an inductive position sensor, specifically three receiver coils configured as a geometric shape.

As shown in FIGS. 4A and 4B for a three-phase system, the DC component, even harmonics, a third harmonic, and multiples of the third harmonic (e.g., the $6^{th}$, $9^{th}$, $12^{th}$, $15^{th}$, etc. harmonics), may be nullified by use of a known stator having a first receiver coil 404(A), a second receiver coil 404(B), and a third receiver coil 404(C). In this implementation, the receiver coils 404(A)/404(B)/404(C) are electrically offset by one-hundred and twenty degrees (120°) (which equates to thirty degrees (30°) mechanical), resulting in the measured angular position signal P (as calculated by the control unit) being a difference between the phases of each receiver coil voltage (i.e., Vr1, Vr2 and Vr3) such that the third harmonics are cancelled/nullified, as defined by Equation Set 2:

$$P = \sin(\Theta + 120) - \sin(\Theta) = \sqrt{3(\cos(\Theta + 60)}$$

$$3^{rd}\ \text{Harmonic} = \sin(3*\Theta + 3*120) - \sin(3*\Theta) = 0 \qquad \text{Equation Set 2}$$

However, as shown in FIG. 4B, the fifth ($5^{th}$) harmonic and other higher harmonics are still present in the receiver coil voltages and limit the accuracy of the known inductive position sensor of FIGS. 4A and 4B.

Various implementations of the present disclosure eliminate one or more of the harmonic distortions in the receiver coil voltages generated in double and triple receiver coil inductive position sensors by replacing known configurations for a target 106 with a new target configured in accordance with an implementation of the present disclosure, as described below with reference to FIGS. 5A-5E and/or by modifying the receiver coils 404, as described below with reference to FIGS. 6A and 6B. Specifically, the target coils and/or receiver coils can be configured (e.g., configured with rotational offsets, configured with sizes and/or shapes) so that waveforms (also can be referred to as values) induced within the receiver coils will nullify harmonics in receiver coil voltages. The harmonics that are nullified would otherwise be manifested in the receiver coil voltages if the target coils and/or receiver coils were not configured to nullify them. Angular position signals that are defined based on receiver coil voltages without harmonics will likewise not include undesirable artifacts due to the harmonics. Accordingly, nullifying harmonics within the receiver coil voltages using the target and/or receiver coil configurations described herein can results in angular position signals that are devoid of harmonics.

As an example, a first target coil can be configured to induce a first waveform associated with a harmonic (e.g., a harmonic intended for nullification) into a receiver coil, and a second target coil can be configured to induce a second waveform (opposite the first waveform) associated with the harmonic into the receiver coil such that the harmonic is nullified in the receiver coil voltage. The receiver coil voltage (and other receiver coil voltages) can be used by a control unit to produce an angular position signal that is devoid of artifacts related to the harmonic that has been nullified.

It should be noted that any of the features described with respect to FIGS. 5A through 5E can be applied to any of the other embodiments described in connection with FIGS. 6A through 7B. Likewise, any of the features described with respect to FIGS. 6A through 7B can be applied to any of the other embodiments described in connection with FIGS. 5A through 5E.

Figure 5A:
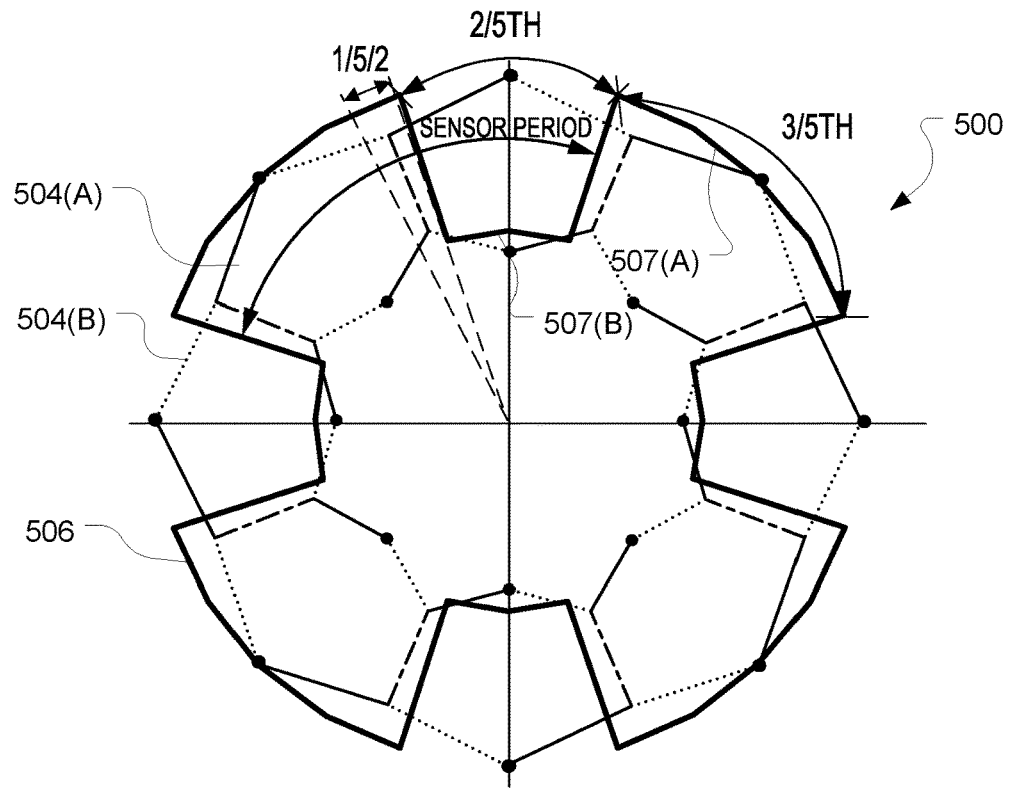
FIG. 5A is a schematic representation of an asymmetric target coil superimposed above a receiver coil and as configured for an inductive position sensor in accordance with at least one implementation of the present disclosure.

As shown in FIG. 5A and for at least one implementation of the present disclosure, an inductive position sensor 500 may include an excitation coil (not shown) and a first receiver coil 504(A), configured in an anti-series configuration, as discussed above with reference to FIG. 3A. The inductive position sensor 500 of FIG. 5A includes a target (e.g., also can be referred to as a rotor) that includes a first target coil 506. The first target coil 506 is configured as an asymmetrical loop relative to the first receiver coil 504(A) configuration. For a symmetrical loop, the target coil 506 may be one-half ($½$) of the period of the first receiver coil 504(A). For an implementation of the present disclosure, the target coil 506 is formed as an asymmetrical loop that is offset relative to a harmonic period corresponding with a harmonic (also can be referred to as a candidate harmonic) "N" to be nullified. The offset can be expressed as a "shift ratio" ($+/-1/N/2$), where "N" is an integer. For a non-limiting example, the target coil 506 includes an outer lobe extending (e.g., having a width or a size extending) $(N+1)/(2N)$ and an inner lobe extending (e.g., having a width or a size) $(N-1)/(2N)$. Accordingly, the outer lobe and/or the inner lobe can have a size (or width) (e.g., an angular size or width) as shown in FIG. 5A based on a shift ratio.

The sensor period, shown by the arrow in FIG. 5A (and other figures herein), represents a symmetry within the target coil 506. For example, in the implementation shown in FIG. 5A, the target coil 506 has four outer lobes (and four inner lobes). Accordingly, the target coil 506 has four symmetrical components around the axis of rotation. The target coil 506 has a mechanical symmetry or rotational symmetry (also can be referred to as a symmetry) of ninety degrees ($90°$). The sensor period can be used to define offsets (that can be represented as the shift ratios mentioned above) for configuration of target coils and/or receiver coils for nullification of harmonics.

Specifically, the offsets (represented as shift ratios), described above, are offsets that are based on the sensor period and a harmonic period determined using the sensor period (also can be referred to as a candidate harmonic period). For example, a sensor period can be divided into a harmonic period that corresponds with a particular angular offset. For example, as shown in FIG. 5A, the sensor period is divided into 5 equally sized (from an angular perspective) harmonic periods to configure a target coil 506 intended to nullify a $5^{th}$ harmonic. The harmonic periods can mathematically be sectors. Accordingly, the four lobes have widths and shapes that are defined based on 3 of 5 harmonic periods (or portions) of the sensor period. The inner lobes between the outer lobes are based on 2 of 5 harmonic periods (or portions) of the sensor period. Offsets to nullify harmonics are similarly calculated based on these equally divided harmonic periods (or portions thereof, such as one-half of a harmonic period) of the sensor period.

The number of harmonic periods that can be used to offset various coils can be represented in terms of the shift ratio. The shift ratio can correspond with a shift angle (e.g., a rotational shift angle such as a number of degrees of shift or rotation. More details regarding shift ratios (based on harmonic periods) to nullify harmonics are described below.

As shown in FIG. 5A, the target coil 506 is asymmetric within each of the sensor periods or mechanically symmetric portions of the target coil 506. For a two-phase implementation where N=3, the first target coil 506 is configured with a first outer lobe 507(A) that includes a wire or other conductive material extending for $⅓^{rd}$ of the sensor period of the first receiver coil 504(A) and a first inner lobe 507(B) extending for $⅔^{rd}$ of the sensor period for the first receiver coil 504(A).

As another example, a three-phase implementation, N=5, the first outer lobe 507(A) extends for $⅗^{th}$ of the sensor period of the first receiver coil 504(A), and the first inner lobe 507(B) extends for $⅖^{th}$ of the sensor period for the first receiver coil 504(A). Accordingly, FIG. 5A illustrates the outer lobe 507(A) with a size (e.g., an angular size or width) based on a shift ratio of $⅗^{th}$ and illustrates the inner lobe 507(B) with a size (e.g., an angular size or width) based on a shift ratio of $⅖^{th}$.

Due to the asymmetric configuration of each of the sensor periods of the target coil 506, the Nth harmonic is not introduced in the receiver coil voltage Vr.

The present implementation facilitates nullification of the Nth harmonic in the receiver coil voltage Vr, for receiver coils 504 configured in a stator. Nullification of the Nth harmonic improves the accuracy of an inductive position sensor. Moreover, by using a first inductive position sensor 500 configured in accordance with the above description, and as illustrated in FIG. 5A and shown below in TABLE 1, nullification of the Nth harmonic, such as the fifth ($5^{th}$) harmonic, in a receiver coil voltage Vr, improves the accuracy of the arctangent calculation performed by the control unit and, by extension, the accuracy of the angular position signal P, may occur without changing existing stator designs including, but not limited to, the stator designs illustrated in FIGS. 1A-1B, 2A-2B, 3A-3B and 4A-4B.

Figure 5B:
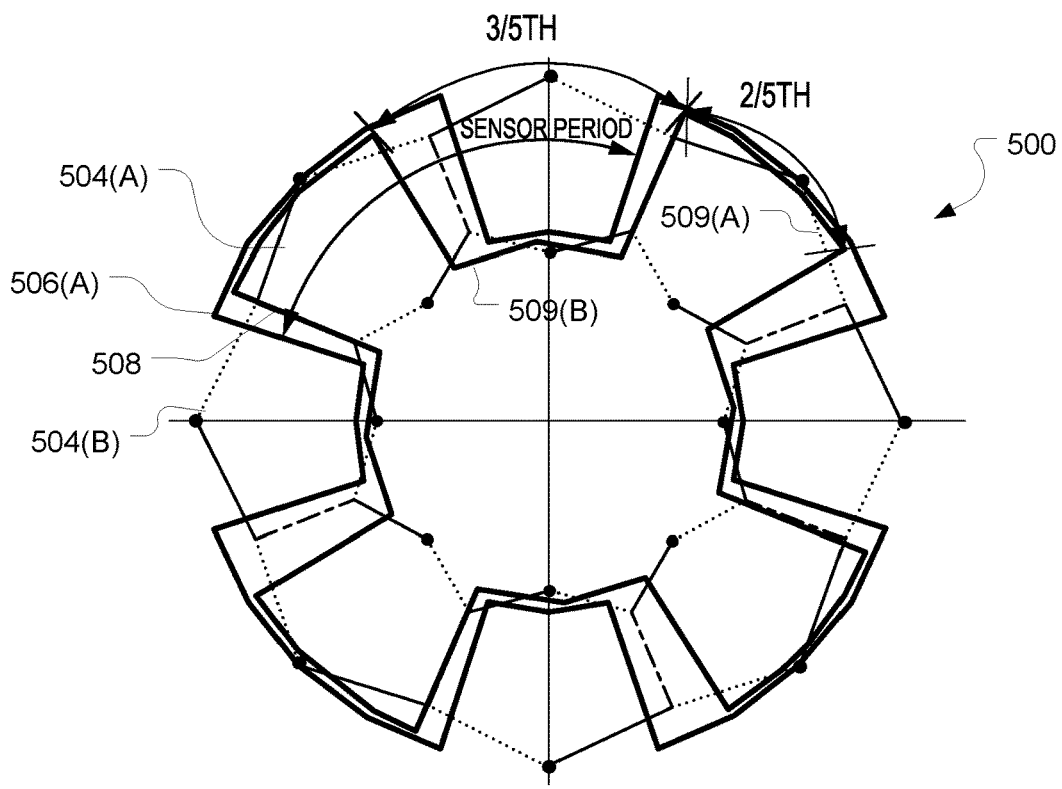
FIG. 5B is a schematic representation of a first asymmetric target coil and a second asymmetric target coil, as superimposed above a receiver coil and as configured for an inductive position sensor in accordance with at least one implementation of the present disclosure.
Figure 5C:
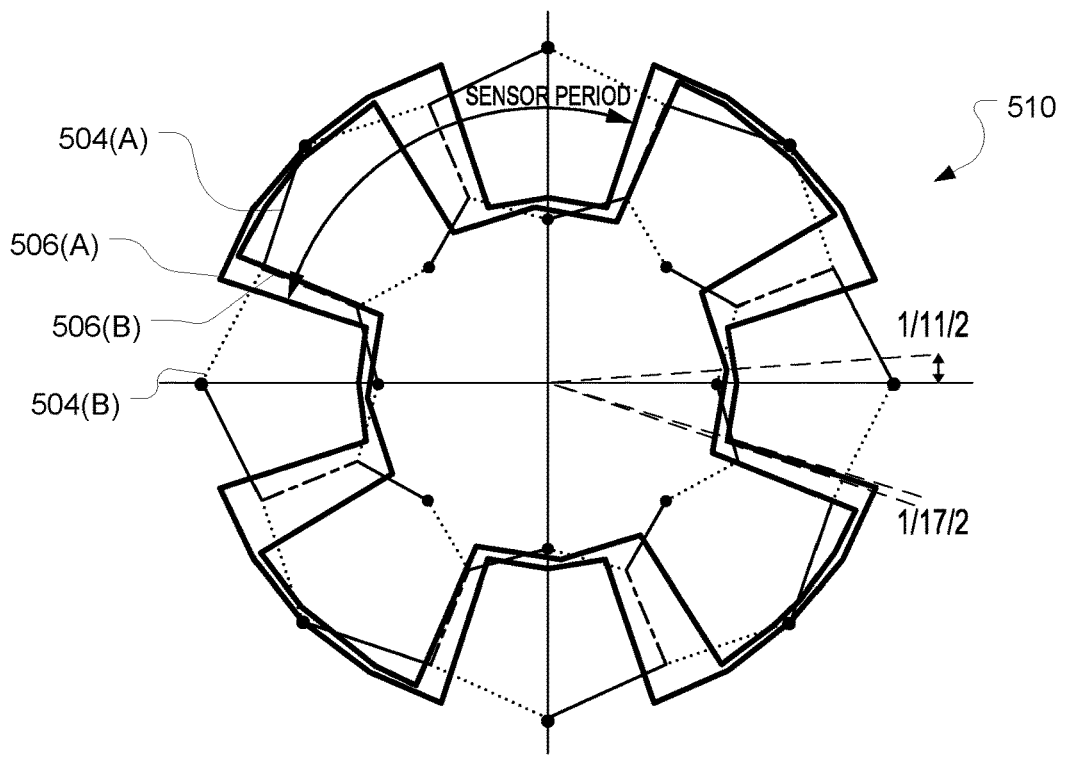
FIG. 5C is a schematic representation of a first asymmetric target coil and a second asymmetric target coil, as superimposed above a receiver coil, where the second target coil is offset relative to the first target coil, and as configured for an inductive position sensor in accordance with at least one implementation of the present disclosure.

As shown in FIGS. 5B and 5C, an inductive position sensor 510 may include an asymmetric first target coil 506 and an asymmetric second target coil 508. For this implementation, the first target coil 506 and the second target coil 508 are configured as asymmetrical loops relative to the first receiver coil 504(A). The first target coil 506 and the second target coil 508 are each offset by the "shift ratio" relative to a harmonic period of the first harmonic N to be nullified. For at least one implementation, the first target coil 506 includes an outer lobe extending (N+1)/(2N) and an inner lobe extending (N−1)/(2N). The second target coil 508 includes an outer lobe 509(A) extending (N−1)/(2N) and an inner lobe 509(B) extending (N+1)/(2N). Further, the second target coil 508 is offset, relative to the first target coil 506 and with respect to a harmonic period of a harmonic "M" to be cancelled by a second shift ratio (+/−1/M/2).

The offset can be with respect to an aligned position between the first target coil 506 and the second target coil 508. For example, as shown in FIGS. 5B and 5C, the offset is manifested in the outer lobes (and inner lobes) of the first target coil 506 and the second target coil 508, respectively, not being centered. Instead, the outer lobes (and inner lobes) of the second target coil 508 are misaligned, or not centered, with respect to the outer lobes (and inner lobes) of the first target coil 506.

For a two-phase implementation, M=5, the fifth ($5^{th}$) harmonic. For a three-phase implementation, M=11, the eleventh ($11^{th}$) harmonic. Using such an inductive position sensor 510, the N and M harmonics otherwise present in the receiver coil voltage Vr may be nullified—as shown for this implementation, the $5^{th}$ harmonic and the $11^{th}$ harmonic are nullified. Nullification of the two harmonics improves the accuracy of an inductive position sensor. Moreover, by using a target configured in accordance with the above description, and as shown below in TABLE 1, nullification of at least two harmonics in a receiver coil voltage Vr may occur without changing existing stator designs including, but not limited to, the stator designs illustrated in FIGS. 3A and 4A.

Figure 5D:
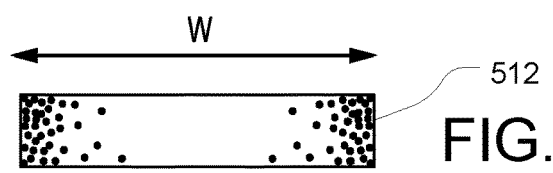
FIG. 5D is a graphical representation of the skin effect.

As higher harmonics get cancelled, the half-period distance of an offset (e.g., shift) becomes ever smaller and PCB manufacturing capabilities may impose limitations on harmonics that may be nullified in the receiver coil voltages for an inductive position sensor. Further, at high frequencies an alternating electrical current will distribute within a conductor, such as a target coil, such that the current density is largest near the surface of the conductor, while exponentially decreasing with greater depths in the conductor. This is effect can be referred to as the "skin effects" 512 and is illustrated in FIG. 5D. In inductive position sensors, skin effects occur due to the high frequencies used, such as frequencies in the one to ten mega-hertz (1-10 MHz) range. In accordance with at least one implementation of the present disclosure, the skin effect is utilized to nullify a higher order harmonic "S," such as the seventeenth ($17^{tH}$) harmonic, by modifying the width W of the wire (also can be referred to as a wire width) used for the target coil loops. This can be referred to as skin width.

For at least one implementation, the one or more target coil loops are configured to have a width W equal to one-half (½) of a harmonic period of the harmonic S to be nullified (W=1/S/2), such as the thirteenth ($13^{th}$) harmonic for a two-phase system and the seventeenth ($17^{th}$) harmonic for a three-phase system. As shown below in TABLE 1, use of the skin effect may facilitate nullification of the harmonic S in a receiver coil voltage Vr without changing existing stator designs including, but not limited to, the stator designs illustrated in FIGS. 3A and 4A.

Because the physical shape of a harmonic period tapers toward a center of a coil, the width W (for nullifying a harmonic utilizing the skin effect) can increase from an inner portion of the coil to an outer portion of the coil. This width tapers based on the shape of the harmonic period. Accordingly, the width W to nullify a higher order harmonic using the skin effect can taper from a smaller width toward an inner portion (or center) of a lobe to a larger width toward an outer portion (outer circumference) of the lobe. In some implementations, a width (e.g., an average width) between the smaller width and the larger width can be used so that a consistent width can be used to form a coil.

Figure 5E:
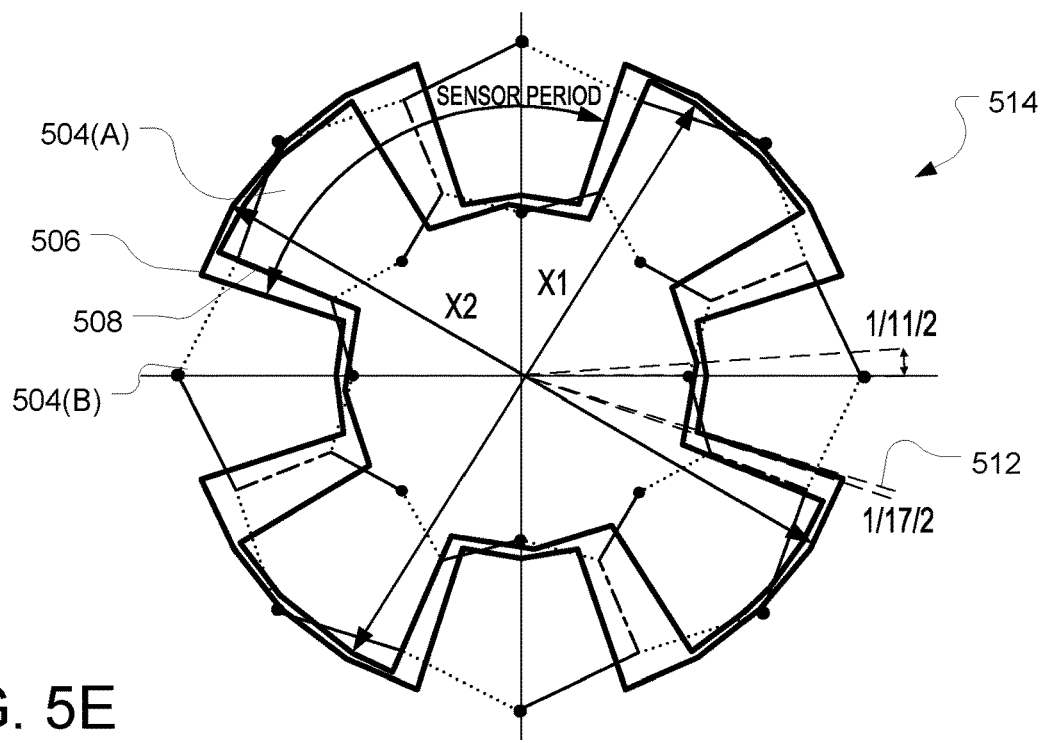
FIG. 5E is a schematic representation of a first asymmetric target coil and a second asymmetric target coil, as superimposed above a receiver coil, where the second target coil is offset relative to the first target coil and the target coils are configured to facilitate use of the skin effect, and as configured for an inductive position sensor in accordance with at least one implementation of the present disclosure.

For at least one implementation of the present disclosure and as shown in FIG. 5E, an inductive position sensor 514 utilizes the skin effect 512 (as shown in FIG. 5D) and the inductive position sensor 510 configured as per FIG. 5C to nullify multiple harmonics in the receiver coil voltage. As shown below in TABLE 1, the FIG. 5E combination facilitates nullification of the N, M and S harmonics in the receiver coil voltages Vr. The harmonics nullified may be chosen by an inductive position sensor designer, with non-limiting examples of harmonics nullified including the $5^{th}$ harmonic, the $11^{th}$ harmonic, and the $17^{th}$ harmonic. Nullification of multiple harmonics may occur without changing existing stator designs including, but not limited to, the stator designs illustrated in FIGS. 3A and 4A.

As shown in FIGS. 5B through 5E, the second target coil 508 is concentrically disposed within the first target coil 506. In some implementations, the second target coil 508 has an outer diameter (shown as distance X1 in FIG. 5E) smaller than an outer diameter (shown as distance X2 in FIG. 5E) of the first target coil 506. In some implementations, the second target coil 508 has a largest size dimension (shown as distance X1 in FIG. 5E) than a largest size dimension (shown as distance X2 in FIG. 5E) of the first target coil 506.

Figure 6A:
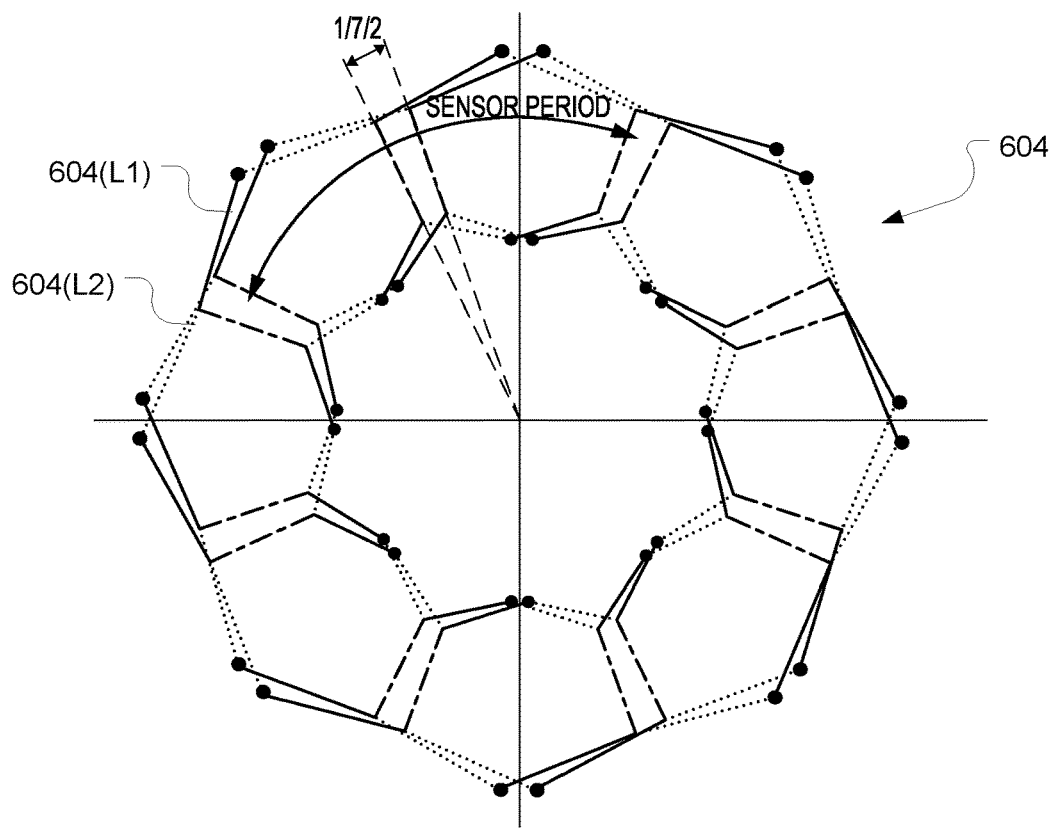
FIG. 6A is a schematic representation, for a receiver coil of an inductive position sensor, of a first set of receiver coil loops that includes a first loop and a second loop and a second set of the receiver coil loops that includes a third loop and a fourth loop, and as configured in accordance with at least one implementation of the present disclosure.

As shown in FIG. 6A and for at least one implementation of the present disclosure, an inductive position sensor may include an excitation coil (not shown), at least one target coil (not shown), and a stator including a representative first receiver coil 604 having a first set of first receiver coil loops 604(L1), including a first receiver coil first loop and a first receiver coil second loop, and a second set of first receiver coil loops 604(L2) including a first receiver coil third loop and a third receiver coil fourth loop. The first set and second set of first receiver coil loops are configured in a series configuration, and the second set of first receiver coil loops 604(L2) is offset, relative to the first set of first receiver coil loops 604(L1), by one-half (½) of a "R" harmonic period corresponding to a harmonic R (i.e., the shift may be expressed as: 1/R/2), such as the seventh ($7^{th}$) harmonic period. By connecting first and second set of first receiver coil loops 604(L1) and 604(L2) in series and shifting the second set of first receiver coil loops 604(L2), relative to the first set of first receiver coil loops 604(L1) by one-half (½) of a harmonic period of the harmonic R, the harmonic R may be nullified. As shown in FIG. 6A, the seventh ($7^{th}$) harmonic is nullified. Accordingly, the present implementation facilitates nullification of the harmonic R, such as the $7^{th}$ harmonic in the receiver coil voltage(s) Vr, for receiver coils 604 configured in a stator. The results from use of this implementation are shown below in TABLE 1, where nullification of harmonics in a receiver coil voltage Vr may occur without changing existing target designs including, but not limited to, the target designs illustrated in FIGS. 3A and 4A.

Figure 6B:
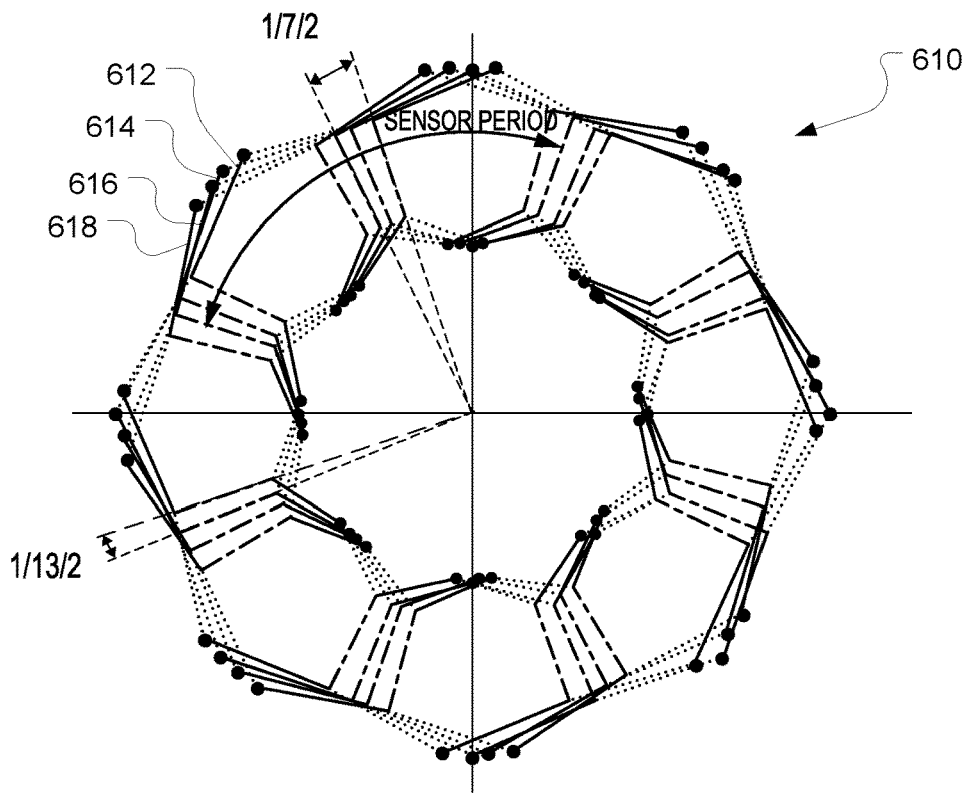
FIG. 6B is a schematic representation, for a receiver coil of an inductive position sensor, of a first pair and a second pair of receiver coil loops where each pair includes a first set and a second set of receiver coil loops as shown in FIG. 6A and as configured in accordance with at least one implementation of the present disclosure.

As shown in FIG. 6B and for at least one implementation of the present disclosure, a first receiver coil 610 may include multiple pairings of sets of receiver coils (612, 614, 616, 618). For example, a first pair of receiver coil loops may include a first set of receiver coil loops 612 and a second set of receiver coil loops 614. The first set of receiver coil loops 612 may include a first loop and a second loop. The second set of receiver coil loops 614 may include a third loop and a fourth loop. A second pair of receiver coil loops may include a third set of receiver coil loops, having a configuration which corresponds to the first set of receiver coil loops, and a fourth set of receiver coil loops, having a configuration which corresponds to the second set of receiver coil loops.

By providing a coil having two pairings of two sets, where a set includes two loops (eight loops total), the receiver coil voltage Vr is effectively quadrupled. The second pair of loops are offset, relative to the first pair of loops, by one-half (½) of a "T" harmonic to be nullified (i.e., the shift may be expressed as: 1/T/2), such as an eleventh ($11^{th}$) harmonic (not shown) for a two-phase system and the illustrated thirteenth ($13^{th}$) period for a three-phase system. Any additional harmonic may be selected as the T harmonic for nullification. The results from use of this implementation are shown below in TABLE 1, where nullification of harmonics in a receiver coil voltage Vr may occur without changing existing target designs including, but not limited to, the target designs illustrated in FIGS. 3A and 4A.

Figure 7A:
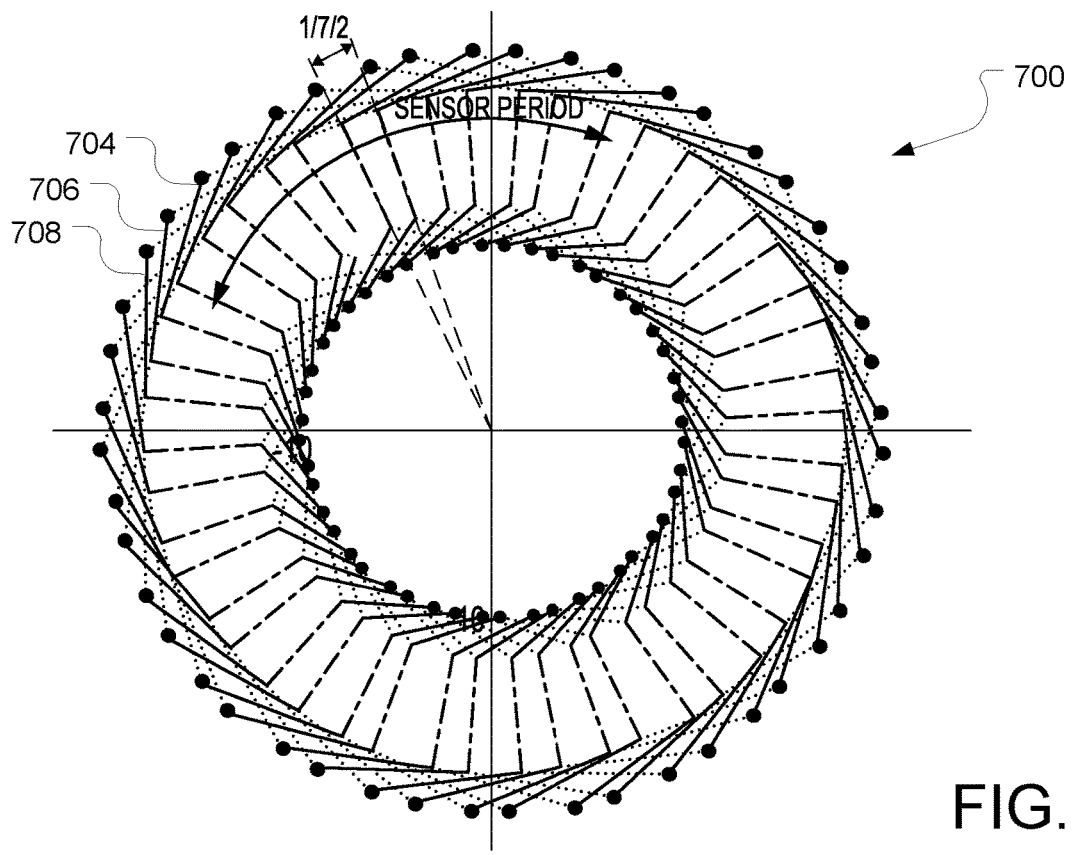
FIG. 7A is a schematic representation of a three phase inductive position sensor configured in accordance with at least one implementation of the present disclosure.

As shown in FIG. 7A and for at least one implementation of the present disclosure, an inductive position sensor 700 may include three receiver coils configured as per the implementations of FIG. 6A. An implementation with three receiver coils configured as per the implementation of FIG. 6B is not shown due to drawing complexity. As shown, the inductive position sensor may include a first receiver coil 704, a second receiver coil 706, and a third receiver coil 708, with each coil configured as per the implementation of FIG. 6B.

Figure 7B:
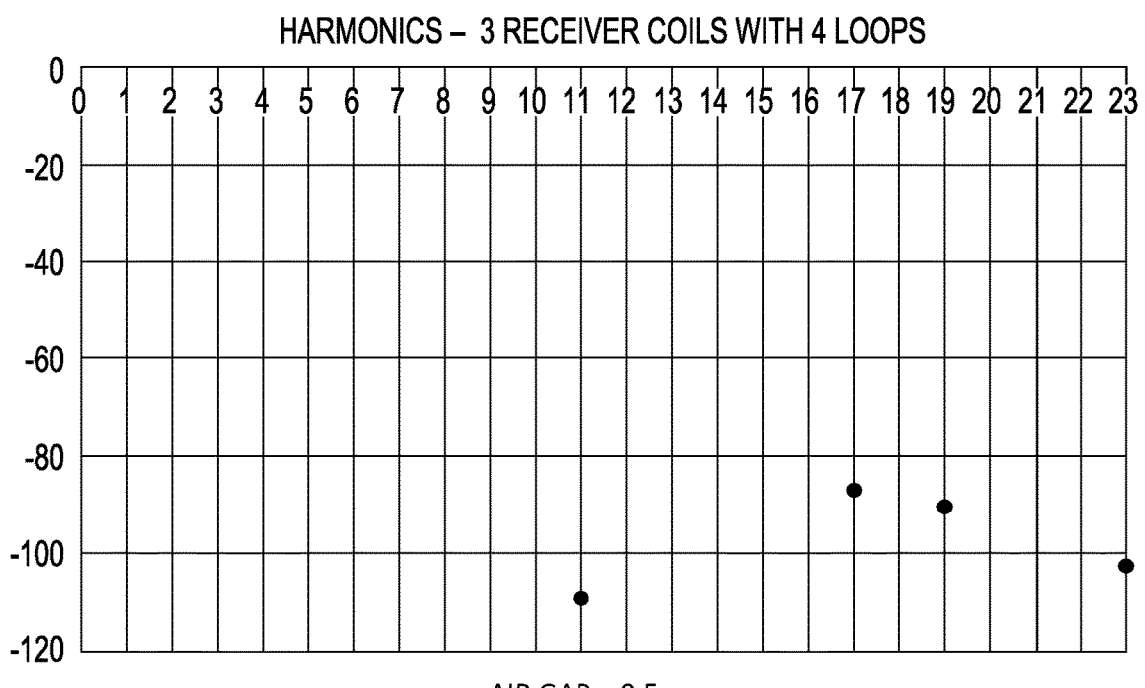
FIG. 7B is a chart illustrating harmonics present in receiver voltages for an inductive position sensor configured in accordance with at least one implementation of the present disclosure.

Results obtained from the inductive position sensor 700, when combined the target configurations of FIG. 5C are shown in FIG. 7B and are further identified in TABLE 1 below. It is anticipated, based on simulations and excluding improvements from use of the skin effect, that the total harmonic distortion in the angular position signal P is improved by one or more implementations of the present disclosure from a negative forty decibels (−40 dB) to negative eighty five decibels (−85 dB). Further, it is anticipated, again based on simulation and excluding improvements from use of the skin effect, that the noise level of the N, M, R and T harmonics nullified, such as the respective $5^{th}$, $7^{th}$, $11^{th}$ and $13^{th}$ harmonics, will each be less than negative one-hundred decibels (−100 dB) by one or more implementations of the present disclosure. When the skin effect is utilized, as per the implementation of FIG. 5E, it is anticipated that S harmonic, such as the seventeenth ($17^{th}$) harmonics, will also be significantly reduced if not nullified entirely.

TABLE 1

Receiver coil voltage Vr Signal Components & Harmonics Nullified For Implementations of Present Disclosure

| | FIG. 3A Coil with 2 Loops In a Two-Phase Sensor | FIG. 4A Three-Phase Sensor |
|---|---|---|
| PRIOR ART | ☒DC; ☒$2^{nd}$; ☐$3^{rd}$; ☐$5^{th}$; ☐$7^{th}$; ☐$11^{th}$; ☐$13^{th}$; ☐$17^{th}$; ☐$19^{th}$ | ☒DC; ☒$2^{nd}$; ☒$3^{rd}$; ☐$5^{th}$; ☐$7^{th}$; ☐$11^{th}$; ☐$13^{th}$; ☐$17^{th}$; ☐$19^{th}$ |
| Rotor Improvements | | |
| FIG. 5A & 5B (dual asymmetric loops) | ☒DC; ☒$2^{nd}$; ☒$3^{rd}$; ☐$5^{th}$; ☐$7^{th}$; ☐$11^{th}$; ☐$13^{th}$; ☐$17^{th}$; ☐$19^{th}$ | ☒DC; ☒$2^{nd}$; ☒$3^{rd}$; ☒$5^{th}$; ☐$7^{th}$; ☐$11^{th}$; ☐$13^{th}$; ☐$17^{th}$; ☐$19^{th}$ |
| FIG. 5C (offset loops) | ☒DC; ☒$2^{nd}$; ☒$3^{rd}$; ☒$5^{th}$; ☐$7^{th}$; ☐$11^{th}$; ☐$13^{th}$; ☐$17^{th}$; ☐$19^{th}$ | ☒DC; ☒$2^{nd}$; ☒$3^{rd}$; ☒$5^{th}$; ☐$7^{th}$; ☒$11^{th}$; ☐$13^{th}$; ☐$17^{th}$; ☐$19^{th}$ |
| FIG. 5E (dual asymmetric, offset loops plus skin effect) | ☒DC; ☒$2^{nd}$; ☒$3^{rd}$; ☒$5^{th}$; ☐$7^{th}$; ☐$11^{th}$; ☒$13^{th}$; ☐$17^{th}$; ☐$19^{th}$ | ☒DC; ☒$2^{nd}$; ☒$3^{rd}$; ☒$5^{th}$; ☐$7^{th}$; ☒$11^{th}$; ☐$13^{th}$; ☒$17^{th}$; ☐$19^{th}$ |
| STATOR IMPROVEMENTS | | |
| FIG. 6A (2 sets with 2 loops) | ☒DC; ☒$2^{nd}$; ☐$3^{rd}$; ☐$5^{th}$; ☒$7^{th}$; ☐$11^{th}$; ☐$13^{th}$; ☐$17^{th}$; ☐$19^{th}$ | ☒DC; ☒$2^{nd}$; ☒$3^{rd}$; ☐$5^{th}$; ☒$7^{th}$; ☐$11^{th}$; ☐$13^{th}$; ☐$17^{th}$; ☐$19^{th}$ |
| FIG. 6B (2 pairs of 2 sets with 2 loops) | ☒DC; ☒$2^{nd}$; ☐$3^{rd}$; ☐$5^{th}$; ☒$7^{th}$; ☒$11^{th}$; ☐$13^{th}$; ☐$17^{th}$; ☐$19^{th}$ | ☒DC; ☒$2^{nd}$; ☒$3^{rd}$; ☐$5^{th}$; ☒$7^{th}$; ☐$11^{th}$; ☒$13^{th}$; ☐$17^{th}$; ☐$19^{th}$ |
| ROTOR with STATOR IMPROVEMENTS | | |
| FIG. 5B with FIG. 6A | ☒DC; ☒$2^{nd}$; ☒$3^{rd}$; ☐$5^{th}$; ☒$7^{th}$; ☐$11^{th}$; ☐$13^{th}$; ☐$17^{th}$; ☐$19^{th}$ | ☒DC; ☒$2^{nd}$; ☒$3^{rd}$; ☒$5^{th}$; ☒$7^{th}$; ☐$11^{th}$; ☐$13^{th}$; ☐$17^{th}$; ☐$19^{th}$ |
| FIG. 5B with FIG. 6B | ☒DC; ☒$2^{nd}$; ☒$3^{rd}$; ☐$5^{th}$; ☒$7^{th}$; ☒$11^{th}$; ☐$13^{th}$; ☐$17^{th}$; ☐$19^{th}$ | ☒DC; ☒$2^{nd}$; ☒$3^{rd}$; ☒$5^{th}$; ☒$7^{th}$; ☐$11^{th}$; ☒$13^{th}$; ☐$17^{th}$; ☐$19^{th}$ |
| FIG. 5C with FIG. 6A | ☒DC; ☒$2^{nd}$; ☒$3^{rd}$; ☒$5^{th}$; ☒$7^{th}$; ☐$11^{th}$; ☐$13^{th}$; ☐$17^{th}$; ☐$19^{th}$ | ☒DC; ☒$2^{nd}$; ☒$3^{rd}$; ☒$5^{th}$; ☒$7^{th}$; ☒$11^{th}$; ☐$13^{th}$; ☐$17^{th}$; ☐$19^{th}$ |
| FIG. 5C with FIG. 6B | ☒DC; ☒$2^{nd}$; ☒$3^{rd}$; ☒$5^{th}$; ☒$7^{th}$; ☒$11^{th}$; ☐$13^{th}$; ☐$17^{th}$; ☐$19^{th}$ | ☒DC; ☒$2^{nd}$; ☒$3^{rd}$; ☒$5^{th}$; ☒$7^{th}$; ☒$11^{th}$; ☒$13^{th}$; ☐$17^{th}$; ☐$19^{th}$ |

TABLE 1-continued

Receiver coil voltage Vr Signal Components & Harmonics Nullified For Implementations of Present Disclosure

| | FIG. 3A Coil with 2 Loops In a Two-Phase Sensor | FIG. 4A Three-Phase Sensor |
|---|---|---|
| FIG. 5E with FIG. 6A | ☒$_{DC}$; ☒$_{2^{nd}}$; ☒$_{3^{rd}}$; ☒$_{5^{th}}$; ☒$_{7^{th}}$; ☐$_{11^{th}}$; ☒$_{13^{th}}$; ☐$_{17^{th}}$; ☐$_{19^{th}}$ | ☒$_{DC}$; ☒$_{2^{nd}}$; ☒$_{3^{rd}}$; ☒$_{5^{th}}$; ☒$_{7^{th}}$; ☒$_{11^{th}}$; ☐$_{13^{th}}$; ☒$_{17^{th}}$; ☐$_{19^{th}}$ |
| FIG. 5E with FIG. 6B (as shown in FIG. 7B) | ☒$_{DC}$; ☒$_{2^{nd}}$; ☒$_{3^{rd}}$; ☒$_{5^{th}}$; ☒$_{7^{th}}$; ☒$_{11^{th}}$; ☒$_{13^{th}}$; ☐$_{17^{th}}$; ☐$_{19^{th}}$ | ☒$_{DC}$; ☒$_{2^{nd}}$; ☒$_{3^{rd}}$; ☒$_{5^{th}}$; ☒$_{7^{th}}$; ☒$_{11^{th}}$; ☒$_{13^{th}}$; ☒$_{17^{th}}$; ☐$_{19^{th}}$ |

In Table 1, Integer multiples of the $2^{nd}$ harmonics and $3^{rd}$ harmonics are not shown but are nullified when the respective $2^{nd}$ or $3^{rd}$ harmonic is nullified. Although certain order harmonics are illustrated in Table 1, the harmonics that are intended for nullification may not be limited to those described herein. Additional harmonics may be nullified using any of the configurations and techniques described herein.

In accordance with at least one implementation of the present disclosure an inductive position sensor may include a target and a stator. The stator may include an excitation coil which generates a first electromagnetic field while receiving an alternating signal from a power source. A target is inductively coupled (a "first inductive coupling") to the excitation coil by the first electromagnetic field. Due to the first inductive coupling of the target with the excitation coil, the target generates a second electromagnetic field.

The sensor may include a first receiver coil which further may include: a first set of first receiver coil loops that include a first receiver coil first loop connected in series with a first receiver coil second loop, and a second set of receiver coil loops that include a first receiver coil third loop connected in series with a first receiver coil fourth loop. The first set of first receiver coil loops and the second set of first receiver coil loops are connected in series. The first receiver coil may be inductively coupled (a "second inductive coupling") to the target by the second electromagnetic field and a first receiver coil voltage Vr1 may be generated in the first receiver coil due to the second inductive coupling.

The first receiver coil third loop and the first receiver coil fourth loop may be offset (e.g., angularly shifted, shifted in an angular or rotational direction, shifted by rotation at a specified angle), on the stator and relative to the first receiver coil first loop and the first receiver coil second loop, by a first portion of a first harmonic (R1). The sensor may include a control unit, coupled to the first receiver coil, configured to receive the first receiver coil voltage Vr1 from the first receiver coil and a second receiver coil voltage Vr2 from a second receiver coil coupled to the control unit. R1 may be nullified in at least Vr1 and the control unit, based on Vr1 and Vr2, generate an angular position signal P.

Implementations may include one or more of the following features. The inductive position sensor may include: where the first portion may be one-half (½) of R1; and where R1 may be a seventh ($7^{th}$) harmonic of Vr1.

The second receiver coil further may include: a first set of second receiver coil loops that include a second receiver coil first loop and a second receiver coil second loop, and a second set of second receiver coil loops that include a second receiver coil third loop and a second receiver coil fourth loop. The first set of second receiver coil loops and the second set of second receiver coil loops may be connected in series and the second receiver coil may be inductively coupled (a "third inductive coupling") to the target by the second electromagnetic field. The second receiver coil voltage Vr2 may be generated in the second receiver coil due to the third inductive coupling. The second set of second receiver coil loops may be offset, on the stator and relative to the first set of second receiver coil loops, by the first portion of R1.

The first receiver coil may have a first rotational symmetry on the stator. The second receiver coil has a second receiver coil symmetry corresponding to the first rotational symmetry. The second receiver coil symmetry may be offset, on the stator, by one-quarter (¼) of the first rotational symmetry. The first rotational symmetry may be a ninety-degree (90) mechanical symmetry. R1 may be nullified by respective shifting of the first first/second receiver coil third and fourth loops relative to the respective first/second receiver coil first and second loops. A second harmonic may be nullified by respective shifting of the first receiver coil first loop second receiver coil relative to the first receiver coil. R1 may be a seventh (7th) harmonic.

The target further may include a first target coil that may include a first outer lobe extending a first ratio of a harmonic N of the first receiver coil and a first inner lobe extending a second ratio of the harmonic N of the first receiver coil. The first ratio plus the second ratio equals one. A second target coil may include a second outer lobe extending the second ratio of the harmonic N of the first receiver coil and a second inner lobe extending the first ratio of the harmonic N of the first receiver coil. The first target coil does not introduce the harmonic N into Vr1 and Vr2 and the second target coil does not introduce the harmonic N into Vr1 and Vr2.

The second target coil may be offset relative to the first target coil by a third ratio of a second harmonic M. The harmonic M may be nullified in Vr1 and in Vr2.

At least one of a following condition applies: the first ratio=(n+1)/(2n), the second ratio=(N−1)/(2N), the third ratio=½, N=3 and M=5.

The first receiver coil may have a first symmetry on the stator. The second receiver coil further may include a first set and a second set of second receiver coil loops, respectively including, for the first set, a second receiver coil first loop and a second receiver coil second loop and, for the second set, a second receiver coil third loop and a second receiver coil fourth loop. The first and second sets of second receiver coil loops may be connected in series. The second receiver coil may be inductively coupled (the "third inductive coupling") to the target by the second electromagnetic field. The second receiver coil voltage Vr2 may be generated in the second receiver coil due to the third inductive coupling. The second set of second receiver coil loops may be offset, on the stator and relative to the first set of second receiver coil loops, by the first portion of the first harmonic R1.

The second receiver coil has a second receiver coil symmetry that corresponds to the first rotational symmetry and may be offset, on the stator, 120 electrical degrees relative to the first receiver coil. The inductive position sensor further may include a third receiver coil, coupled to the control unit. The third receiver coil may include a first set of third receiver coil loops and a second set of third receiver coil loops. The third receiver coil loops may be connected in series. The third receiver coil may be inductively coupled (a "fourth inductive coupling") to the target by the second electromagnetic field. A third receiver coil voltage Vr3 may be generated in the third receiver coil due to the fourth inductive coupling. The second set of third receiver coil loops may be offset, on the stator and relative to the first set of third receiver coil loops, by the first portion of the first harmonic R1. The third receiver coil may have a third receiver coil symmetry corresponding to the first rotational symmetry and may be offset, on the stator, 120 electrical degrees relative to the second receiver coil symmetry. The second target coil loop may be offset relative to the first target coil loop by a third ratio of a harmonic M and the harmonic M may be nullified in Vr1, Vr2 and Vr3.

For at least one implementation, an inductive position sensor may include a target and a stator. The stator may include an excitation coil which generates a first electromagnetic field while receiving an alternating signal from a power source. The target may be inductively coupled (the "first inductive coupling") to the excitation coil by the first electromagnetic field. Due to the first inductive coupling of the target with the excitation coil, the target generates a second electromagnetic field. The sensor may include a first receiver coil that includes, in an electrical series configuration: a first receiver coil first loop and a first receiver coil second loop. The first receiver coil first loop and the first receiver coil second loop form a first pair; and where the first receiver coil second loop may be offset, on the stator and relative to the first receiver coil first loop, by a given ratio of a first harmonic (R1). The given ratio may equal one-half (½).

The sensor may include a third set of first receiver coil loops and a fourth set of first receiver coil loops. The third set of first receiver coil loops and the fourth set of first receiver coil loops form a second pair. The second set of first receiver coil loops is offset, on the stator and relative to the first set of first receiver coil loops, by the given ratio of the first harmonic R1.

The sensor may include where the second pair is offset from the first pair by the given ratio of a second harmonic (R2). The first receiver coil is inductively coupled (the "second inductive coupling") to the target by the second electromagnetic field, where a first receiver coil voltage Vr1 is generated in the first receiver coil due to the second inductive coupling. The sensor may include a control unit, coupled to the first receiver coil, configured to receive the first receiver coil voltage Vr1 from the first receiver coil and a second receiver coil voltage Vr2 from a second receiver coil in which R1 and R2 are nullified. Based on Vr1 and Vr2, the control unit may generate an angular position signal P.

The first receiver coil and the second receiver coil may have identical configurations. The first receiver coil may have a first rotational symmetry on the stator and the second receiver coil may be offset, on the stator, by one-quarter (¼) of the first rotational symmetry.

The first receiver coil may have a first rotational symmetry on the stator and a third receiver coil may be coupled to the control unit. The second receiver coil may have the first symmetry and may be offset, on the stator, 120 electrical degrees relative to the first receiver coil. The third receiver coil may have the first symmetry and may be offset, on the stator, 120 electrical degrees relative to the second receiver coil.

The target further may include a first target coil that includes a first outer lobe extending a first ratio of a harmonic N of the first receiver coil and a first inner lobe extending a second ratio of the harmonic N of the first receiver coil. The first ratio plus the second ratio equals one. A second target coil may include a second outer lobe extending the first ratio of the harmonic N of the first receiver coil and a second inner lobe extending the second ratio of the harmonic N of the first receiver coil. The first target coil does not introduce the harmonic N into the first receiver coil voltage Vr1 and the second target coil does not introduce the harmonic N into the second receiver coil voltage Vr2. The second target coil loop may be offset relative to the first target coil loop by a third ratio of a second harmonic M and the harmonic M may be nullified in Vr1 and in Vr2.

For at least one implementation, a rotor may include a first target coil that may further include a first outer lobe extending a first ratio of a harmonic N of the first receiver coil, and a first inner lobe extending a second ratio of the harmonic N of the first receiver coil, where the first ratio plus the second ratio equals one. The rotor may include a second target coil may include that includes a second outer lobe extending the second ratio of the harmonic N of the first receiver coil, and a second inner lobe extending the first ratio of the harmonic N of the first receiver coil. The first target coil does not introduce the harmonic N into a first receiver coil voltage Vr1 generated by a first receiver coil inductively coupled to the rotor. The second target coil does not introduce the harmonic N into a second receiver coil voltage Vr2 generated by a second receiver coil inductively coupled to the rotor.

The rotor may be configured such that the second target coil is offset relative to the first target coil by a third ratio of a harmonic M. The harmonic M may be nullified in Vr1 and Vr2.

The first target coil and the second target coil may have a width W equal to one-half (½) of a higher order harmonic S to be nullified in Vr1 and Vr2.

Although various implementations of the claimed invention have been described above with a certain degree of particularity, or with reference to one or more individual implementations, those skilled in the art could make alterations to the disclosed implementations without departing from the spirit or scope of the claimed invention. The use of the terms "about," "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom," "left" and "right," "up" or "down," "first," "second," "before," "after," and other similar terms are used for description and ease of reference purposes only and are not intended to be limiting to any orientation or configuration of any elements or sequences of operations for the various implementations of the present disclosure. Further, the terms "and" and "or" are not intended to be used in a limiting or expansive nature and cover any range of combinations of elements and operations of an implementation of the present disclosure. Other implementations are therefore contemplated. It is intended that all matter contained in the above description and shown in the accompanying drawings shall be interpreted as illustrative only of implementations and not limiting. Changes in detail or structure may be made without departing from the basic elements of the invention as defined in the following claims.

What is claimed is:

1. An inductive position sensor comprising:
   a target including:
      a first target coil including a first outer lobe, and
      a second target coil including a second outer lobe offset from the first outer lobe, the first target coil being electrically isolated from the second target coil;
   a stator including:
      an excitation coil configured to be inductively coupled to the target; and
      a receiver coil including a first loop connected in series with a second loop, and configured to be inductively coupled with the target such that a receiver coil voltage is generated at the receiver coil,
      the second loop being offset, on the stator and relative to the first loop, by a portion of a harmonic period corresponding with a harmonic for nullification in the receiver coil voltage; and
   a control unit configured to receive a plurality of receiver coil voltages including the receiver coil voltage, the control unit configured to generate an angular position signal based on the plurality of receiver coil voltages.

2. The inductive position sensor of claim 1, wherein: the portion is one-half (½) of the harmonic period, and the harmonic is a seventh ($7^{th}$) order harmonic.

3. The inductive position sensor of claim 1, wherein the receiver coil is a first receiver coil,
   the inductive position sensor, further comprising:
      a second receiver coil having a first loop connected in series with a second loop, and configured to be inductively coupled with the target,
      the first loop of the second receiver coil being offset, on the stator and relative to the second loop of the second receiver coil, by the portion of the harmonic period,
      the first receiver coil having a rotational symmetry on the stator, and
      the second receiver coil being offset, on the stator, by one-quarter (¼) of the rotational symmetry.

4. The inductive position sensor of claim 3, wherein the rotational symmetry is a ninety-degree (90°) mechanical symmetry.

5. The inductive position sensor of claim 4, wherein the harmonic is a seventh ($7^{th}$) order harmonic.

6. The inductive position sensor of claim 4, wherein the harmonic period is a first harmonic period, and the harmonic is a first harmonic, the receiver coil is a first receiver coil, the target further including:
   the first target coil including the first outer lobe extending a first ratio of a second harmonic period of the first receiver coil, and a first inner lobe extending a second ratio of the second harmonic period, the second harmonic period corresponding with a second harmonic, the first ratio being different from the second ratio; and
   the second target coil including the second outer lobe having a size based on the second ratio, and a second inner lobe having a size based on the first ratio,
   the first target coil inducing a first waveform associated with the second harmonic into the receiver coil, and the second target coil inducing a second waveform associated with the second harmonic, and opposite the first waveform, into the receiver coil such that the second harmonic is nullified in the receiver coil voltage.

7. The inductive position sensor of claim 6, wherein the second target coil is offset relative to the first target coil by a third ratio of a third harmonic period such that a third harmonic is nullified.

8. The inductive position sensor of claim 7, wherein the third harmonic is at least an eleventh order ($11^{th}$) harmonic for a three-phase system, and the third harmonic is at least a fifth order ($5^{th}$) harmonic for a two-phase system.

9. The inductive position sensor of claim 6, wherein the first ratio is 3/N and the second ratio is 2/N for a three-phase system where N=5 or the first ratio is 1/N and the second ratio is 2/N for a two-phase system where N=3.

10. The inductive position sensor of claim 1, wherein the receiver coil is a first receiver coil,
    the inductive position sensor, further comprising:
       a second receiver coil having a first loop connected in series with a second loop, and configured to be inductively coupled with the target,
       the first loop of the second receiver coil being offset, on the stator and relative to the second loop of the second receiver coil, by the portion of the harmonic period,
       the first receiver coil having a rotational symmetry on the stator, and
       the second receiver coil having the rotational symmetry and being offset, on the stator, one-third of a sensor period relative to the first receiver coil; and
       a third receiver coil having the rotational symmetry and being offset, on the stator, one-third of the sensor period relative to the second receiver coil.

11. The inductive position sensor of claim 10, wherein the harmonic period is a first harmonic period, and the harmonic is a first harmonic,
    the target further including:
       the first target coil including the first outer lobe having a size based on a first ratio of a second harmonic period of the first receiver coil, and a first inner lobe having a size based on a second ratio of the second harmonic period, the second harmonic period corresponding with a second harmonic, the first ratio being different from the second ratio; and
       the second target coil including the second outer lobe having a size based on the second ratio, and a second inner lobe having a size based on the first ratio,
       the first target coil inducing a first waveform associated with the second harmonic into the receiver coil, and the second target coil inducing a second waveform associated with the second harmonic, and opposite the first waveform, into the receiver coil such that the second harmonic is nullified in the receiver coil voltage.

12. The inductive position sensor of claim 11, wherein the second target coil is offset relative to the first target coil by a third ratio of a third harmonic period such that a third harmonic is nullified.

13. An inductive position sensor comprising:
a target including:
  a first target coil including a first outer lobe, and
  a second target coil including a second outer lobe having a size different from a size of the first outer lobe, the second target coil being concentrically disposed within the first target coil;
a stator comprising:
  an excitation coil;
  a receiver coil configured to be inductively coupled to the target such that a receiver coil voltage is generated, the receiver coil including a first loop, a second loop, a third loop, and a fourth loop, the first loop and the second loop being a first pair, the third loop and the fourth loop being a second pair,
  the second loop being offset, on the stator and relative to the first loop, a ratio of a first harmonic period, the ratio being one-half, the first harmonic period corresponding with a first harmonic for nullification in the receiver coil,
  the fourth loop being offset, on the stator and relative to the third loop, by the ratio of the first harmonic period,
  the second pair being offset from the first pair by a ratio of a second harmonic period, the second harmonic period corresponding with a second harmonic for nullification in the receiver coil; and
a control unit configured to receive a plurality of receiver coil voltages including the receiver coil voltage, the control unit configured to generate an angular position signal based on the plurality of receiver coil voltages.

14. The inductive position sensor of claim 13, wherein the receiver coil is a first receiver coil,
the inductive position sensor, further comprising:
  a second receiver coil having an identical configuration as the first receiver coil,
  the first receiver coil having a rotational symmetry on the stator, and the second receiver coil is offset, on the stator, by one-quarter (¼) of the rotational symmetry.

15. The inductive position sensor of claim 13, wherein the receiver coil is a first receiver coil, the first receiver coil has a rotational symmetry on the stator,
the inductive position sensor, further comprising:
  a second receiver coil having the rotational symmetry and being offset, on the stator, one-third of a sensor period relative to the first receiver coil; and
  a third receiver coil having the rotational symmetry and being offset, on the stator, one-third of a sensor period relative to the second receiver coil.

16. The inductive position sensor of claim 15, wherein the target further including:
  the first target coil including the first outer lobe having the size based on a first ratio of a second harmonic period of the first receiver coil, and a first inner lobe having a size based on a second ratio of the second harmonic period, the second harmonic period corresponding with a second harmonic, the first ratio being different from the second ratio; and
  the second target coil including the second outer lobe having the size based on the second ratio, and a second inner lobe having a size based on the first ratio,
  the first target coil inducing a first waveform associated with the second harmonic into the receiver coil, and the second target coil inducing a second waveform associated with the second harmonic, and opposite the first waveform, into the receiver coil such that the second harmonic is nullified in the receiver coil voltage.

17. The inductive position sensor of claim 16, wherein the second target coil is offset relative to the first target coil by a third ratio of a third harmonic period such that a third harmonic is nullified.

18. An inductive position sensor comprising:
a target including a target coil being asymmetric within each sensor period;
a stator including:
  an excitation coil configured to be inductively coupled to the target; and
  a first receiver coil including a first loop connected in series with a second loop, and configured to be inductively coupled with the target such that a receiver coil voltage is generated at the first receiver coil,
  the second loop being offset, on the stator and relative to the first loop, by a portion of a harmonic period corresponding with a harmonic for nullification in the receiver coil voltage,
  a second receiver coil having a first loop connected in series with a second loop, and configured to be inductively coupled with the target,
  the first loop of the second receiver coil is offset, on the stator and relative to the second loop of the second receiver coil, by the portion of the harmonic period; and
a control unit configured to receive a plurality of receiver coil voltages including the receiver coil voltage.

19. The inductive position sensor of claim 18, wherein the control unit is configured to generate an angular position signal based on the plurality of receiver coil voltages.

20. The inductive position sensor of claim 18, wherein:
the first receiver coil has a rotational symmetry on the stator, and
the second receiver coil is offset, on the stator, by one-quarter (¼) of the rotational symmetry.

* * * * *